United States Patent [19]

Takahashi

[11] Patent Number: 5,132,804
[45] Date of Patent: Jul. 21, 1992

[54] VIDEO PRINTER
[75] Inventor: Keizo Takahashi, Tokyo, Japan
[73] Assignee: Yorica Koki Co., Ltd., Tokyo, Japan
[21] Appl. No.: 499,631
[22] Filed: Mar. 27, 1990
[51] Int. Cl.$^5$ .............................................. H04N 5/22
[52] U.S. Cl. ................................. 358/226; 358/909; 358/185
[58] Field of Search ........................... 350/226, 909
[56] References Cited

U.S. PATENT DOCUMENTS

| | | | |
|---|---|---|---|
| 3,104,293 | 9/1963 | Moller | 358/226 |
| 3,510,657 | 5/1970 | Mangiarachima et al. | 358/226 |
| 4,237,492 | 12/1980 | Roth et al. | 358/226 |
| 4,494,148 | 1/1985 | Svatek | 358/226 |
| 4,868,661 | 9/1989 | Takahashi | 358/185 |

Primary Examiner—Edward L. Coles, Sr.
Attorney, Agent, or Firm—Armstrong & Kubovcik

[57] ABSTRACT

This invention relates to a video printer, which permits pictures, slides and projector images to be video printed and displayed on television for enjoyment.

The video printer comprises a lens mounted on one end of a box, a holder for holding a picture, a drawing, etc. or a holder for holding a slide, the holder being detachably secured to the other end of the box, a screen mounted on one side of the box, an image from a projector being projected on the screen, a light source provided in the box and a member with a mirror and provided in the box for rotation by a predetermined angle. An image projected onto the screen is reflected by the mirror surface to be coupled to the lens.

6 Claims, 6 Drawing Sheets

VIDEO PRINTER

BACKGROUND OF THE INVENTION

This invention relates to a video printer, which permits pictures, slides and projector images to be video printed and displayed on television for enjoyment.

A video printer is well known in the art, in which an image projected from a projector onto a front screen is reflected by a mirror surface to be coupled to a side lens for video printing on a video tape with a video camera.

With this kind of prior art video printer, however, only images from a projector can be video printed on video tape, and it was impossible to video print pictures, drawings and slides on video tape.

In the light of this circumstance, the inventor developed and applied for patent a video printer, which also permits video printing of pictures, drawings, etc. on video tape.

This video printer further permits video printing of a title of image provided by the projector on video tape, so that it is very convenient. However, its structure is such that a mirror is inserted into and withdrawn from the box at an end thereof. Therefore, excess light enters the box to have adverse effects on the sharpness or clarity of image produced. In addition, it is impossible to video print slides on video tape.

SUMMARY OF THE INVENTION

An object of the invention is to provide a video printer, which permits images from a projector to be clearly video printed on video tape.

Another object of the invention is to provide a video printer, which also permits clear video printing of slides on video tape.

To attain the above objects of the invention, there is provided a video printer, which comprises a lens mounted on one end of a box, a holder for holding a picture, a drawing sheet, etc. or a holder for holding a slide, the holder being detachably secured to the other end of the box, a screen mounted on one side of the box, an image from a projector being projected on the screen, a light source provided in the box, and a member with a mirror and provided in the box for rotation by a predetermined angle, an image projected on the screen being reflected by the mirror surface to be coupled to the lens.

DETAILED DESCRIPTION OF THE PREFERRED EMBODIMENTS OF THE INVENTION

Now, a preferred embodiment of the invention will be described with reference to the drawings.

Figure 1:
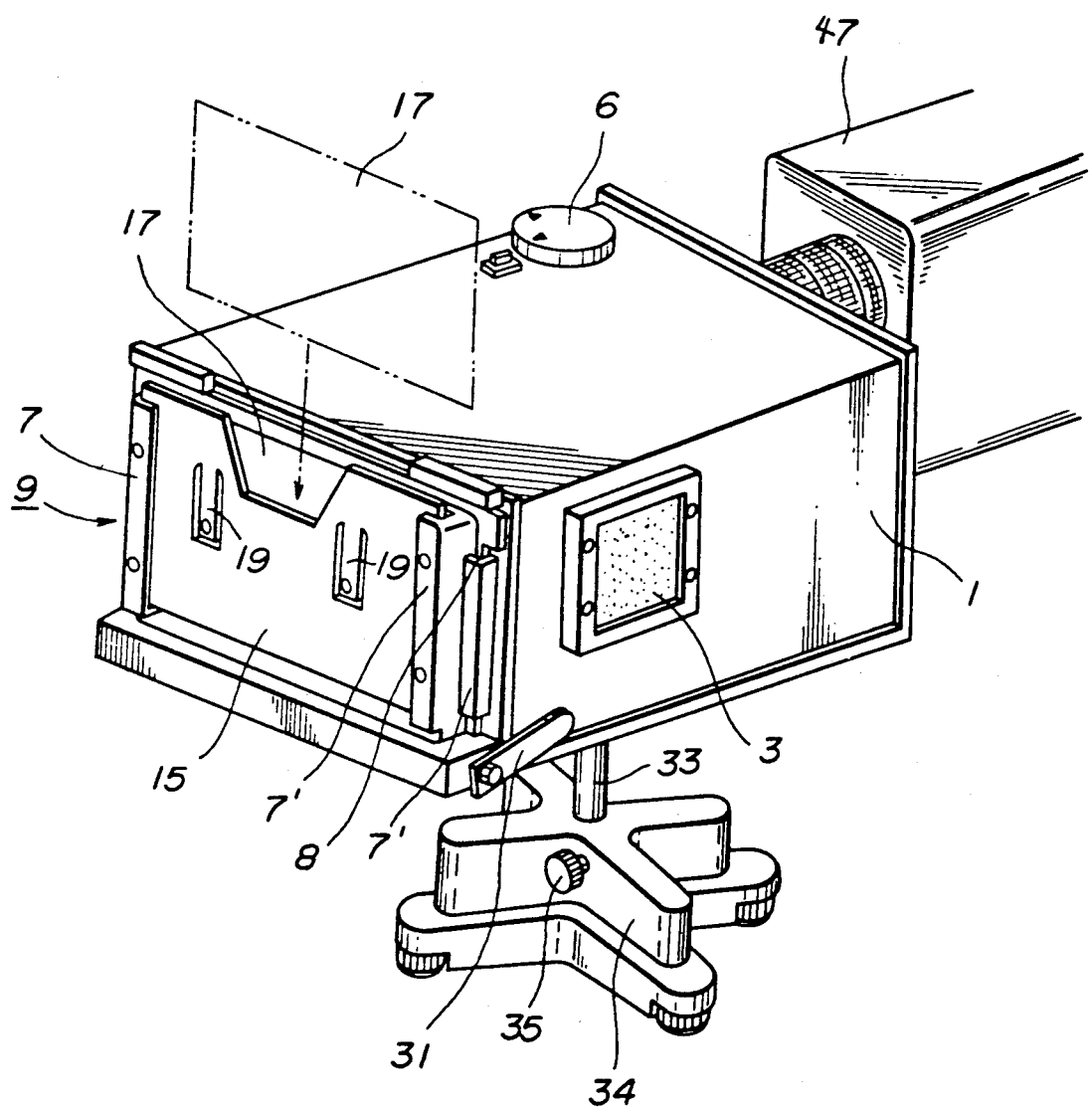
FIG. 1 is a perspective view showing an embodiment of the invention for video printing of a picture, a drawing, etc. or video tape.
Figure 2:
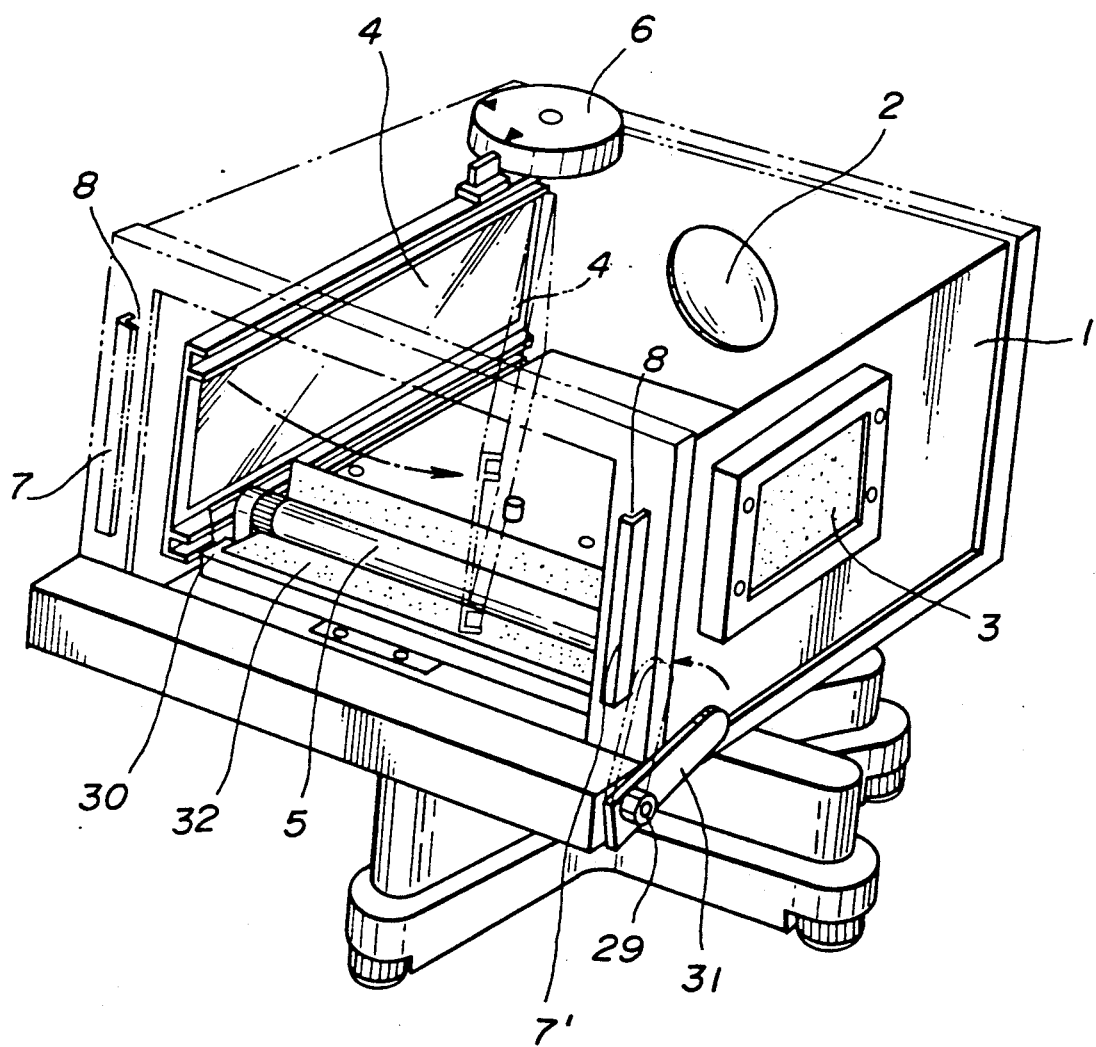
FIG. 2 is a perspective view showing the inner structure of the video printer according to the invention.

FIGS. 1 and 2 are perspective views showing the embodiment of the invention. The illustrated video printer includes box 1 having lens 2 mounted at one end. Screen 3 of a frosted glass is mounted on one side of the box, and plate 4 carrying a mirror mounted thereon and fluorescent lamp 5 are mounted in the box.

Referring to FIG. 2, plate 4 with the mirror is rotatably supported at the rear end by a shaft coupled to the lower end of knob 6 of box 1 and a shaft secured to the bottom of the box. It can be turned by 45 degrees by turning knob 6 at the upper end of the box. An image obtained on screen 3 from a projector with plate 4 held tilted by 45 degrees is reflected by the mirror surface and coupled to lens 2 for printing it on a video tape with video camera 47.

Opposed frameplates 7 and 7' having an L-shaped sectional profile are secured to the opposite sides of the other end of the box such as to form groove-like engagement spaces 8. Holder 9 for holding a picture, a drawing sheet, etc. and holder 10 for holding a slide are detachably supported in spaces by opposite side sections 21 and 22.

Figure 3:
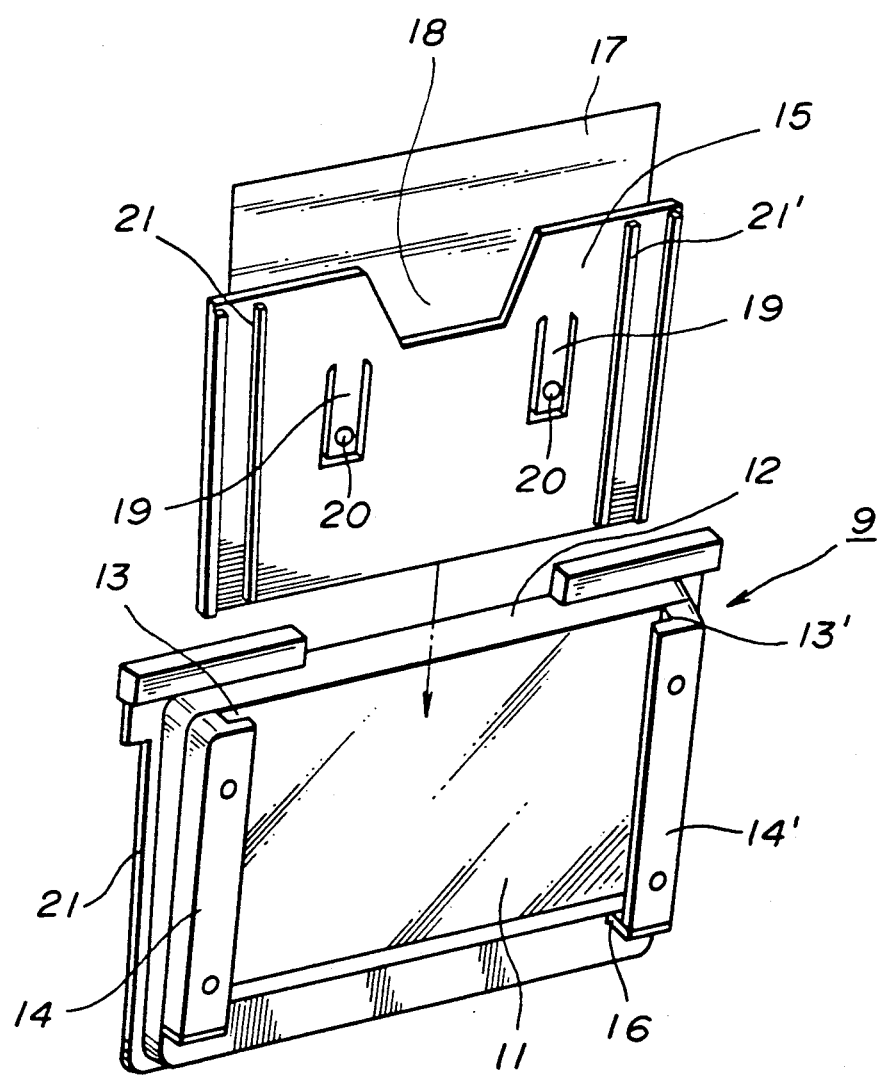
FIG. 3 is a perspective view showing a holder for holding a picture, a drawing, etc. to be used according to the invention.

Holder 9 for holding a picture, a drawing sheet, etc., as shown in FIG. 3, includes frame 12 with transparent glass plate 11 mounted thereon. Vertically elongate members 14 and 14' having L-shaped sectional profile are secured to the opposite sides of frame 12 such as to form engagement spaces 13 and 13'. Plate 15 is detachably mounted in spaces 13 and 13' and is held locked in these spaces by stopper 16 provided at its lower end.

Plate 15 has inverted frust-conical notch 18 formed in its upper end portion to facilitate insertion, removal and movement of picture 17 or the like. Opposite side portions of plate 15 are provided with retainers 19 formed by forming narrow U-shaped slits. Retainers 19 serve to retain the inserted picture, drawing sheet or like 17 with a spring action. The lower end of each retainer 19 is formed with front and back protuberances 20. Vertically elongate bar-like members 21 and 21' are provided on opposite side portions of either surface of the plate. When picture or like 17 is small in size, the plate is inserted such that this surface faces the glass surface, and the picture or like is inserted in the space between bar-like members 21 and 21'.

Figure 4:
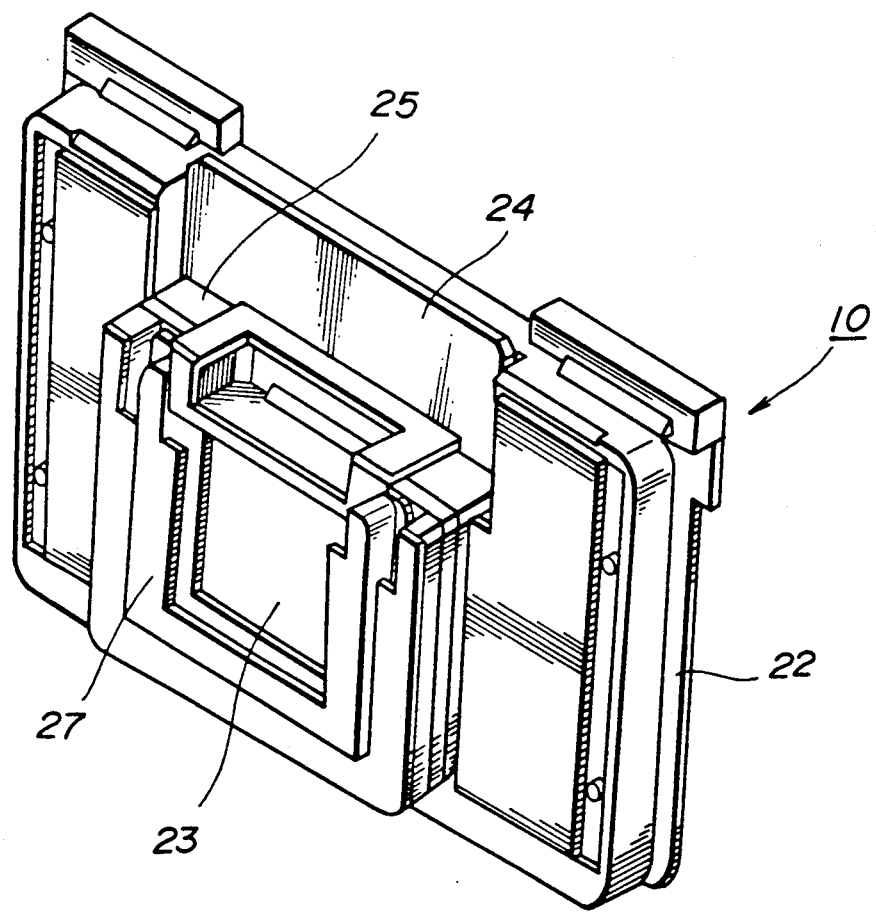
FIG. 4 is a perspective view showing a holder for holding a slide according to the invention.
Figure 5:
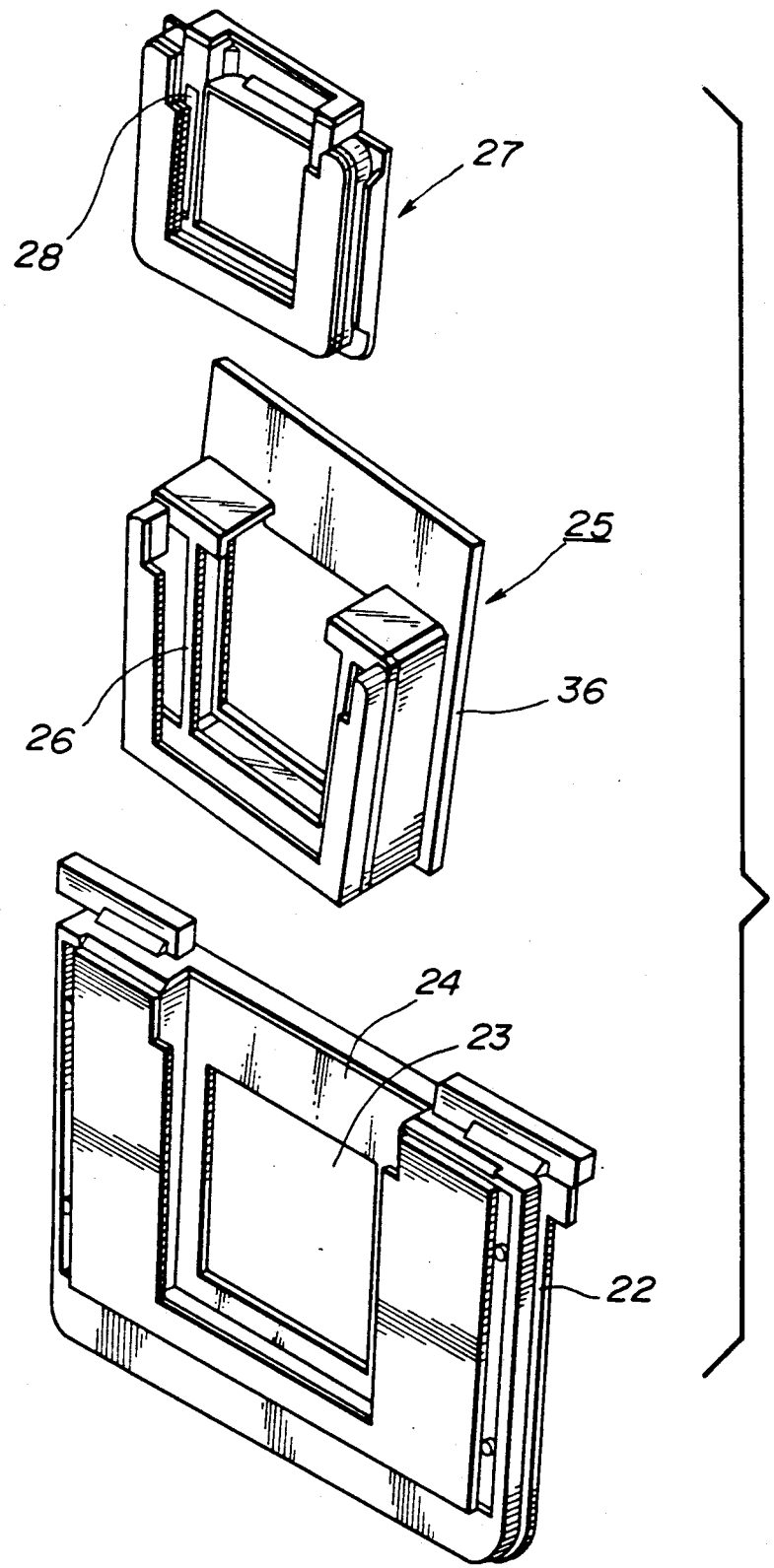
FIG. 5 is an exploded perspective view showing the holder shown in FIG. 4.

Holder 10 for holding a slide, as shown in FIGS. 4 and 5, has frameplate 24 with frosted glass plate 23 mounted thereon. Plate 24 has a central recess, in which first slide retainer 25 is detachably engaged by its opposite sides. First slide retainer 25 has its front surface formed with first slide mounting groove 26, in which second slide retainer 27 is detachably mounted. Second slide retainer 27 also has its front surface formed with second slide retaining groove 28. The two different slide mounting grooves may be selectively used depending on the size of slide.

As shown in FIG. 2, the inside of the box has a step. Fluorescent lamp 5 is secured to rotary plate 30 having one end secured to shaft 29 at the front end. Fluorescent lamp 4 can be erected and turned down by turning handle 31 secured to shaft 29. With this construction, the slide may be video printed by erecting fluorescent lamp 5 and thus increasing the intensity of light from the fluorescent lamp. In this way, the slide can be clearly video printed. While in this embodiment fluorescent lamp 5 can be turned, it is also possible to arrange a fluorescent lamp to be vertically movable.

L-shaped reflector 32 consisting of a silver sheet is secured to a step, on which fluorescent lamp 5 is mounted. It has a function of providing a large amount of uniform light on the picture or the like.

Fluorescent lamp 5 is energized from a battery mounted on the bottom of the box, and it can be turned on and off by on-off operating a switch.

As shown in FIG. 1, height adjustment rod 33 is screwedly secured to the bottom of the box. It is fitted in leg section 34 and can be held at a desired vertical position relative thereto by screw 35 screwed from a side of the leg section.

The function of the video printer having the above construction according to the invention will now be described.

First, as shown in FIG. 1, holder 9 for holding the picture or like is fitted in engagement spaces 8 of the box, and picture or like 17 is insertedly held between glass surface 11 and plate 15. Then, fluorescent lamp 5 is turned on by closing the switch, and an enlarged picture image coupled to lens 2 is video printed on video tape by video camera 47.

When video printing image produced by the projector on video tape, picture or like 17 is withdrawn in FIG. 1, and then knob 6 is turned to tilt the plate with the mirror thereon by 45 degrees. In this state, the image is projected from the projector onto screen 3 and reflected by the mirror surface of plate 4 to be coupled to lens 2 for being video printed with video camera 47.

Figure 6:
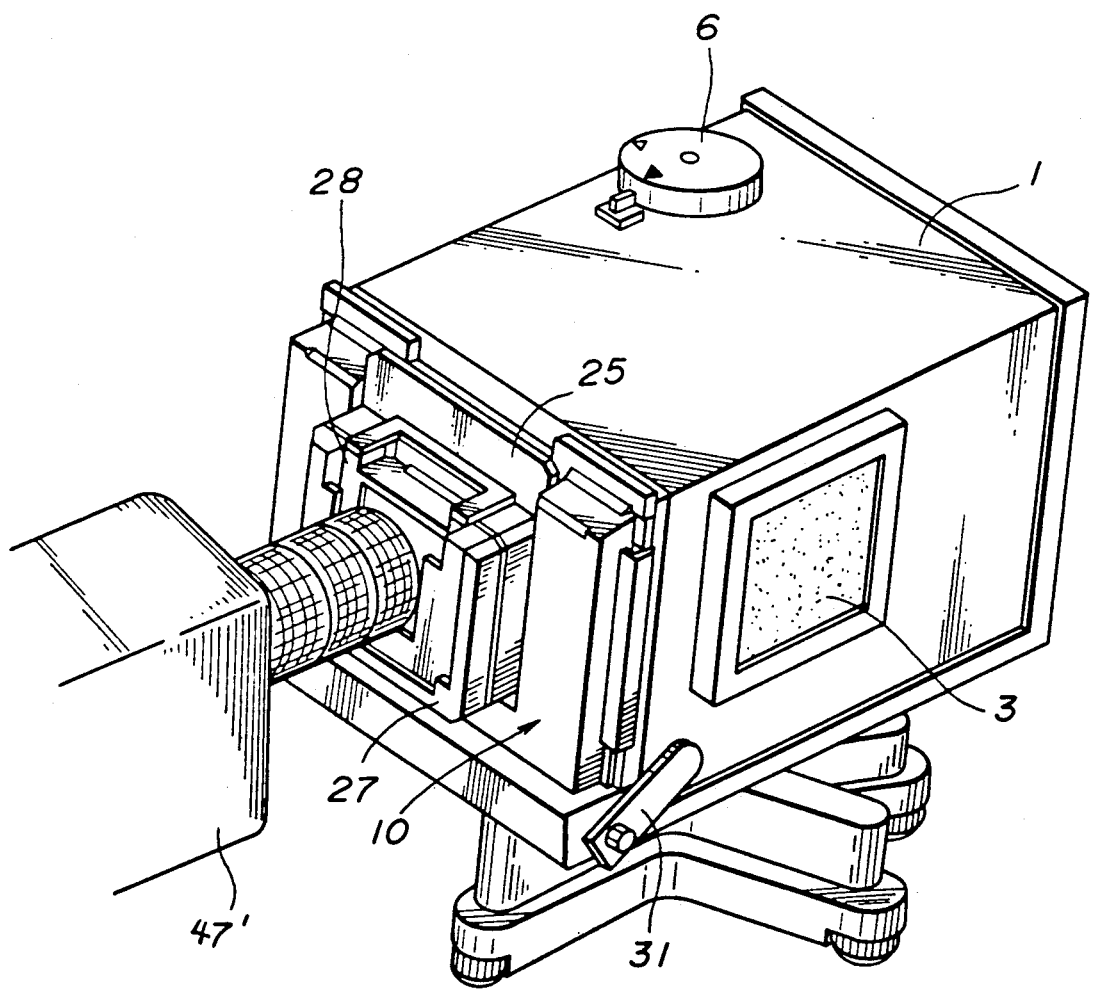
FIG. 6 is a perspective view showing the video printing of a slide on a video tape.

When video printing a slide, plate 4 with the mirror is returned to be parallel to the side surface of box 1, and holder 10 for holding the slide is fitted in the engagement spaces of the box, as shown in FIG. 6. In this state, the slide is fitted in slide retaining grooves 28 of second slide retainer 27. Then, fluorescent lamp 5 is erected by turning handle 31, and the image is video printed on video tape with video camera 47′ When video printing a large slide on video tape, second slide retainer 27 is withdrawn, and the slide is fitted in slide retaining grooves 26 of first slide retainer 25 for video printing it on the video tape.

As has been shown, according to the invention the mirror surface for reflecting an image from the projector is made rotatable in the box. Thus, a clear image can be obtained without excess light entering the box, and it is possible to video print a slide as well. Further, by arranging the light source such that it can be erected and turned down, it is possible to clearly video print a slide on video tape.

What is claimed is:

1. A video printer comprising a lens mounted on one end of a box, a holder for holding a picture, a drawing sheet, etc. or a holder for holding a slide, said holder being detachably secured to the other end of said box, a screen mounted on one side of said box, and image from a projector being projected on said screen, a light source provided in said box, means for moving the light source within the box, and a member with a mirror and provided in said box for rotation by a predetermined angle, an image projected on said screen being reflected by said mirror surface to be couple to said lens.

2. The video printer according to claim 1, wherein said means for moving the light source moves the source vertically.

3. The video printer according to claim 1, wherein said screen is made of frosted glass.

4. The video printer according to claim 1, wherein said the holder for holding a slide includes a first side retainer and a second slide retainer detachable fitted in said first slide retainer.

5. The video printer according to claim 1, wherein said means for moving the light source rotates the light source about an axis.

6. The video printer according to claim 5, wherein said light source is elongated and has a longitudinal axis and said means for moving the light source rotates the light source about an axis generally parallel to the longitudinal axis of the light source.

* * * * *